A. N. MACNICOL.
APPARATUS FOR OBTAINING OILS, SPIRITS, AND GASES FROM ORGANIC OR OTHER MATERIALS OR SUBSTANCES.
APPLICATION FILED JULY 21, 1915.
1,165,889.
Patented Dec. 28, 1915.
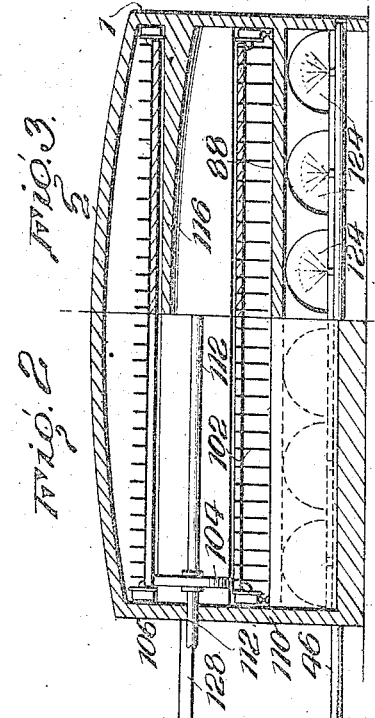
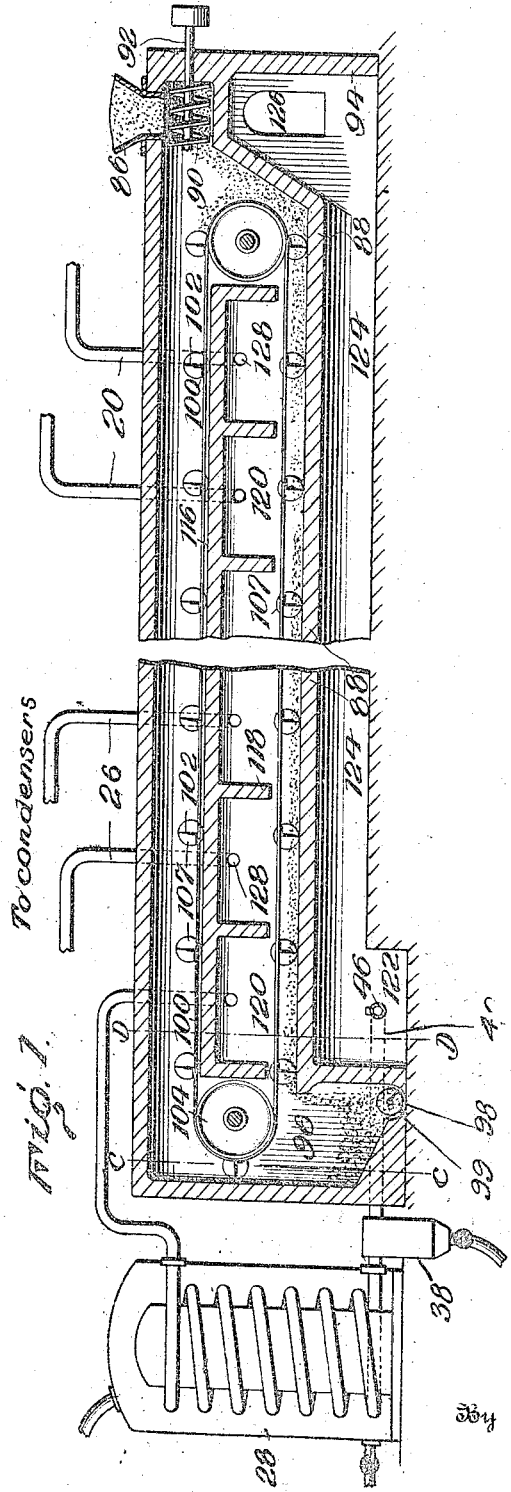
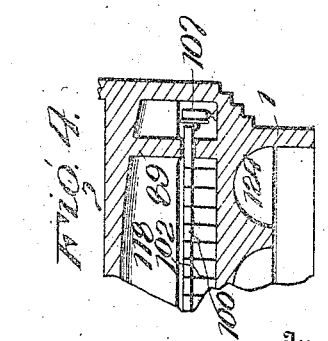
Inventor
A. N. Macnicol
Lawrence Langner
Attorney

UNITED STATES PATENT OFFICE.

ARNOLD NESBITT MACNICOL, OF MELBOURNE, VICTORIA, AUSTRALIA.

APPARATUS FOR OBTAINING OILS, SPIRITS, AND GASES FROM ORGANIC OR OTHER MATERIALS OR SUBSTANCES.

1,165,889. Specification of Letters Patent. Patented Dec. 28, 1915.

Application filed July 21, 1915. Serial No. 41,172.

*To all whom it may concern:*

Be it known that I, ARNOLD NESBITT MACNICOL, a citizen of the Commonwealth of Australia, residing at 31 Queen street, Melbourne, in the State of Victoria and Commonwealth of Australia, have invented certain new and useful Apparatus for Obtaining Oils, Spirits, and Gases from Organic or other Materials or Substances, of which the following is a specification, reference being had therein to the accompanying drawings.

This invention relates to an improved means for obtaining oil, spirits and gases from organic materials such as peat containing gums, resins, or oils, or from other suitable materials or substances and has been devised in order to cheapen the cost of oil or gas production to a great extent.

Hitherto apparatus for the production of oil from peat and organic materials or substances have been open to the objection that a great waste of time and labor is incurred as well as a waste of a considerable portion of the heat generated by the furnace or other heating element of the process.

This invention has been devised in order to overcome these defects and for the purpose of producing oil, spirits and gases from substances containing gums or resins, or oils, and it may also be used for producing lighter oils from heavier oils, it being understood that the resultant oils or spirits or gases are manufactured by and during the process carried out by the apparatus herein described.

The novel features of this invention consist in providing means whereby the process of obtaining oil, spirits and gases from peat or other organic material may be either intermittent or continuous as by the use of the several units, continuous work may be carried on; an even heat is imparted to the mass being treated; utilizing the hot gases as they are generated for the purpose of treating the incoming material into the cylinder or retort, or otherwise; and means whereby the whole of the oils, spirits and gases may be extracted at intervals and as the temperature rises, or alternatively from different parts or sections of the retort as the material being treated is passed therethrough.

A further novel feature consists of moving rabbles arranged and entirely inclosed within the gas-tight retort, the driving shafts extending through glands in the walls of the retort.

The retorts embodied in this invention may be divided into a plurality of sections and the gases led off from these sections by pipe connections to condensers for the extraction of varying grades of oil, the retort sections being used for the convenience of drawing off varying grades of volatilized oils and spirits according to the temperature in the retort, an even rise in the temperature being maintained from the minimum to the maximum temperatures in the said retort.

The process carried out by the apparatus forming the subject matter of this invention consists in first grinding the organic substances such as peat or other material in a mill, unless oil is used and continuously or intermittently feeding the substance by pressure or otherwise into a retort which is gas-tight and is subjected to a graduated heat externally applied, the substance being passed over the heated surface from the minimum temperature at one end to the maximum temperature at the other by rabbles, or agitators or by gravitation to the residue delivery end of the gas-tight retort. The retort may be divided into sections of graduated heat intensity and the volatilized oils led off by pipe connections to a condenser or condensers for distillation. It will be obvious that liquids may also be treated in the process which of course would not require grinding.

The retorts embodied in this invention are preferably arranged horizontally.

Other objects will be in part obvious from the annexed drawings and in part indicated in connection therewith by the following analysis of this invention.

This invention accordingly consists in the features of construction, combination of parts and in the unique relations of the members and in the relative proportioning and disposition thereof; all as more completely outlined herein.

To enable others skilled in the art so fully to comprehend the underlying features thereof that they may embody the same by the numerous modifications in structure and relation contemplated by this invention, drawings depicting a preferred form have been annexed as a part of this disclosure, and in such drawings, like characters of reference denote corresponding parts throughout all the views, of which:—

Figure 1 is a view in vertical central section of one of the various possible embodiments of this invention, while Figs. 2 and 3 are transverse sectional views taken on the lines C—C and D—D Fig. 1 respectively; and Fig. 4 is a fragmentary or detail view somewhat similar to Fig. 3.

In the construction illustrated in Figs. 1, 2, 3 and 4, the retort 2 is of firebrick or other refractory material and is fitted with a hopper 86 receiving the organic material, and the material is continuously fed on to the floor 88 of the retort 2 by means of a screw conveyer 90, the spindle 92 of which projects through the wall 94 of the retort and is operated by belt and pulley or other convenient means. The substances drop by gravity from the screw conveyer 90 on to the floor 88 of the retort, and is rabbled or agitated and carried along the floor while exposed to heat (externally applied) to the discharge end 96 of the retort where the residue is delivered in any suitable manner as by a screw or other conveyer 98 arranged in a suitable trough 99. A sufficient quantity of material is maintained at the inlet as well as the discharge outlet of the retort to form a gas seal to prevent any escape of the volatilized oils. A rabble or rabbles 100 preferably comprising chain carrying spiked bars 102 and flanged rollers 107 travel around spaced drums or rollers 104 arranged at either end and within the retort 2, the upper and lower portions of the rabble being adapted to run on longitudinal rails 106 mounted upon a supporting roof 116 of the retort and upon the floor 88 of the retort 2, sections 120 immediately within the side walls 110 of the said retort 2.

In the modification illustrated in Fig. 4, the retort 2 is wider than the furnace in order to allow the rollers 107 to operate in a cooler zone, the floor of the retort being provided with a partition 89 on the inside of which the rabble operates. The spindle 112 of the rabble driving drum or roller 104 is driven by a bolt or the like from any convenient source of power. The rabble extends approximately the whole length and width of the retort, being entirely inclosed therein and within the rabble, the retort is divided into heat sections. A platform or reef 116 is arranged immediately below the path of the top of the rabble and is formed with a series of spaced transverse walls 118, the spaces 120 between each of the walls 118 forming the retort sections for the volatilized oils, each retort section or zone increasing in temperature regularly from the inlet to the discharge end. The walls 118 extend downwardly a sufficient distance toward the floor 88 of the retort, but allow a sufficient clearance for the rabble 100 operating upon the material over the floor 88 of the retort.

In the retorts illustrated, the temperature is uniformly maintained, the maximum being at the discharge end and the minimum at the inlet end, the maximum temperature being regulated according to the material under treatment. This heating may be accomplished by any heating device or furnace, but preferably by gas burners as illustrated.

The heating element 46 is arranged at one end below and outside the retort 2, the floor of the furnace being cut away at 122 to receive the heating element, while below the retort 2 is formed a series of independent heating flues 124 each receiving independent heat from the burners as shown in Figs. 2 and 3. This arrangement enables an even heat to be maintained across the full width of the retort. The walls of the flues 124 are constructed of refractory material and the heat circulates along the length of the flue below the floor 88 of the retort to an outlet 126 near the feeding end of the said retort. Each of the zones or retort sections 120 is furnished with pipe connections 128 through which the gases are drawn off either by their own pressure or by means of a fan or blower 33 and thence by pipe connections to the condensers 28 for the extraction of oils, spirits or gases in the manner above described. It is, of course, to be understood that these outlets from each of the compartments or respective retort sections connect with respective condensers 28, thence through oil traps 38 permitting the non-condensable gases to be led by the pipes 40 back to the burners 46 where they are used as fuel.

The process therefore consists of the introduction of organic or other substances or materials to a gas-tight retort, the heat being externally applied and the temperature slowly raised to about 700° Fahr. or higher according to the substance being treated or the material may be passed through gradually increasing temperature zones in the manner above described. The gases are then led to condensers where these oils are extracted while the residue and non-condensable gases are returned to the furnace for heating as fuel or to be utilized in gas engines, for the production of power or for lighting purposes according to the use to which they are particularly adapted. Sand or other suitable material may be added to the organic substances in order to distribute the heat and prevent caking during its progress through the retort.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

I claim:

1. In an apparatus for the extraction of oils, spirits, gases and the like of the character set forth, in combination, a retort chamber, rabbles within the retort chamber and arranged to pass over the floor of the retort, means dividing the retort into heat sections, a feeding hopper at one end of the retort, a feeding conveyer adjacent the hopper, means at the opposite end of the retort adapted to expel the material after being treated, means dividing the retort chamber below the floor into a plurality of flue compartments, a source of heat adapted to heat said compartments, means for driving the rabbles over the floor of the retort and pipe connections and a fan between the retort and condensers adapted to draw out the gases from the retort chambers and deliver the same to the condensers.

2. In an apparatus for the extraction of oils, spirits, gases and the like of the character set forth, in combination, a chamber constructed of refractory material, a gas-tight retort carried by the chamber, partitions dividing the retort into heat sections, a plurality of flue compartments receiving heat independent of each other positioned immediately below the floor of the retort and extending longitudinally thereof within the chamber of the refractory material.

3. In an apparatus for the extraction of oils, spirits, gases and the like of the character set forth, in combination, a chamber constructed of refractory material, a gas-tight retort carried by the chamber divided transversely into a plurality of independent heat sections, rabbles adapted to pass through said heat sections and progressively carry material to be treated over one end of the retort to the other, a plurality of heat flues extending longitudinally of the retort and independently of each other beneath the floor of the retort, a source of heat connected with said flues adjacent the delivery end of the retort, means for withdrawing the gases independently from the several heat sections, condensers in which said gases are treated, and means for conducting the non-condensable gases to said source of heat where they are used as fuel.

4. In an apparatus for the extraction of oils, spirits, gases and the like of the character set forth, in combination, a chamber constructed of refractory material, a gas-tight retort carried by the chamber divided transversely into a plurality of independent heat sections, rabbles adapted to pass through said heat sections and progressively carry material to be treated over one end of the retort to the other, a plurality of heat flues extending longitudinally of the retort and independently of each other beneath the floor of the retort, a source of heat connected with said flues adjacent the delivery end of the retort, and means for condensing the gases from said retort, said rabbles extending transversely across the retort and carrying rollers at their end separated from the heat sections of the retort.

In testimony whereof I affix my signature in the presence of two subscribing witnesses.

ARNOLD NESBITT MACNICOL.

Witnesses:
SIDNEY HENDLEY,
ANNE B. EDWARDS.